July 26, 1960  K. E. A. GÖTHBERG  2,946,633
ROLLER BEARING

Filed Jan. 19, 1959  2 Sheets-Sheet 1

INVENTOR:
KARL EVALD ANDREAS GÖTHBERG
BY Howson & Howson
ATTYS.

July 26, 1960 K. E. A. GÖTHBERG 2,946,633
ROLLER BEARING
Filed Jan. 19, 1959 2 Sheets-Sheet 2
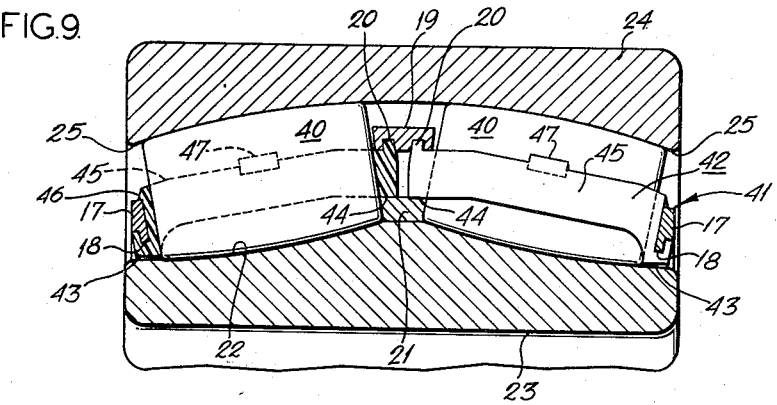
INVENTOR:
KARL EVALD ANDREAS GÖTHBERG
BY Howson & Howson
ATTYS.

# United States Patent Office 2,946,633
Patented July 26, 1960

2,946,633

ROLLER BEARING

Karl Evald Andreas Göthberg, Backasen, Lerum, Sweden, assignor to Aktiebolaget Svenska Kullagerfabriken, Goteberg, Sweden, a corporation of Sweden Filed Jan. 19, 1959, Ser. No. 787,578

Claims priority, application Sweden Jan. 22, 1958

8 Claims. (Cl. 308—217)

The present invention relates to roller bearings, and more particularly to roller cages.

Roller bearings are, as a rule, provided with cages to separate and in some cases to guide the rollers. When the only function of the cage is to separate the rollers, the cage may, as has been previously proposed, comprise separating members of simple form located between the rollers. It has also been proposed to make these members of a material having low coefficient of friction such as plastics and porous sintered materials impregnated with oil. Roller cages made by assembling separating members to form a cage have hitherto not been capable of guiding the rollers to prevent them from assuming skewed positions. The necessity of good guiding by the cage is of special importance when the rollers cannot be properly guided by other members in the bearing, for instance guide flanges, as is the case when the rollers are long relative to their diameter. If not properly guided, the rollers may assume skewed positions, whereby the friction and temperature in the bearing will be increased, resulting in rapid wear in the bearing. In roller cages of known types having separate separating member, the centrifugal forces acting on each member have been taken up either by the rollers or by the outer race ring of the bearing. The result has been an undesirable increase in friction and a rise in temperature.

The purpose of the present invention is to provide a bearing design in which the above mentioned disadvantages are avoided.

More specifically, the invention relates to a roller bearing having a roller cage comprising a number of plastic cage sections each provided with a small number of pockets adapted to fit rollers located therein and consisting of a pair of arcuate portions interconnected by cross bars, the cage sections being held together by metal guide rings.

The outer convex surfaces of the arcuate portions are provided with portions, circular grooves or projections accurately fitting into or onto the guide rings and disposed to be brought into engagement therewith upon radially outward displacement of the cage members toward the guide rings whereby the guide rings take up the centrifugal forces acting on the cage members.

Several forms of the invention are shown on the accompanying drawings in which.

Figure 5:
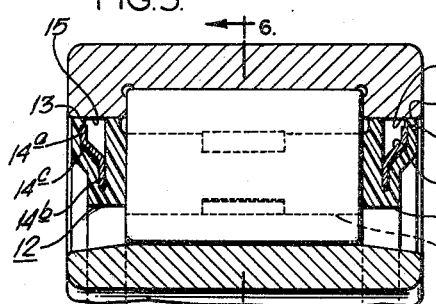
Figure 6:
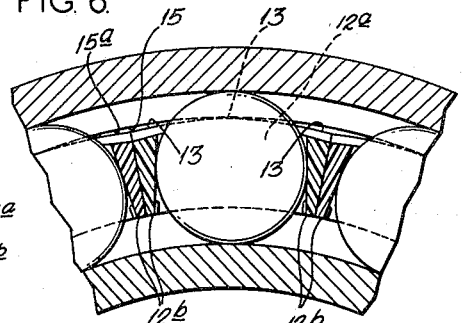
Figure 7:
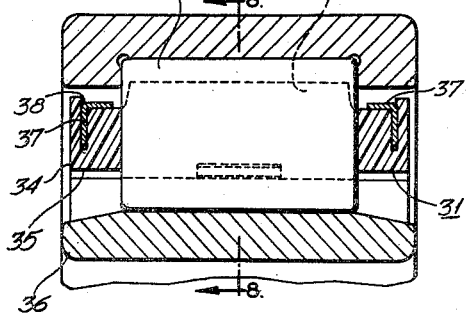
Figure 8:
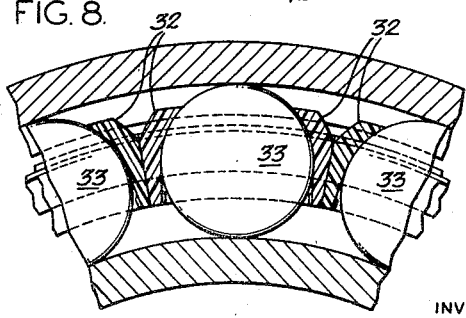

Figs. 5 and 7 respectively are sectional views of cylindrical roller bearings having cages centered in the outer race ring and on the rollers respectively;

Figs. 6 and 8 are sectional views taken on the line 6—6 in Fig. 5 and the line 8—8 in Fig. 7;

Fig. 9 is a sectional view through a portion of a double row spherical bearing;

Fig. 10 is a fragmentary view in side elevation on a smaller scale of one of the steps of the operation assembling the bearing of Fig. 9;

Fig. 11 is a section through a portion of a self-aligning thrust bearing; and

Figure 1:
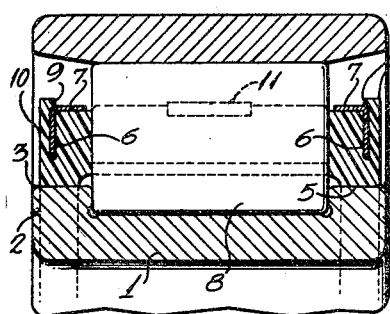
Fig. 1 shows a section through part of a cylindrical roller bearing having a cage centered on the inner race ring.
Figure 2:
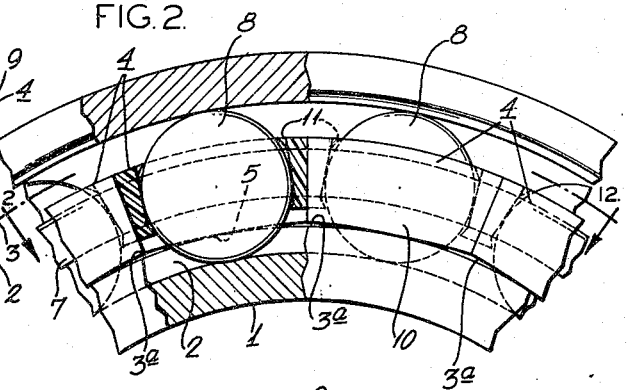
Fig. 2 is a view in elevation with a portion in section of the cage shown in Fig. 1.
Figure 4:
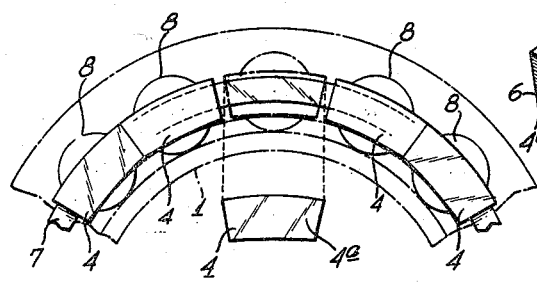
Fig. 4 is a view in side elevation at a reduced scale showing the assembly of the sections of the cage shown in Figs. 1 to 3.
Figure 3:
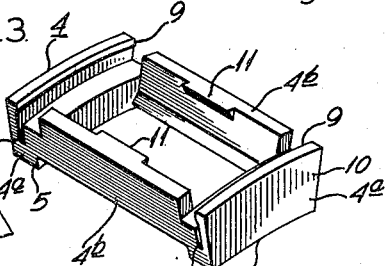
Fig. 3 is a perspective view of one cage section of the embodiment illustrated in Figs. 1 and 2.

Fig. 12 is a sectional view of the bearing shown in Figs. 1 and 2, taken on the line 12—12 of Fig. 2.

In Figs. 1 and 2, the numeral 1 designates a flanged inner race ring of a cylindrical roller bearing having rollers 8 rolling thereon. The rollers are separated by rectangular cage sections 4 of plastic, each comprising a pair of arcuate portions 4a connected by cross bars 4b. The inner surfaces 5 of the arcuate portions 4a of the cage sections 4 slide on the outer cylindrical surfaces 3 of flanges 2 on the inner race ring 1. In order to provide satisfactory lubrication between the surfaces 3 and 5, the radius of the surface 5 is somewhat greater than that of the surface 3, thus forming crescent or wedge-shaped spaces between the surfaces for the formation of a lubricant film when lubricant is forced in between the surfaces 3 and 5 as in a block bearing. These spaces are shown in exaggerated form at 3a in Fig. 2.

Circumferential grooves 6 are formed in the arcuate portions of the cage sections 4, these grooves accurately fitting onto guide rings 7 of sheet metal. The guide rings are L-shaped in section whereby they will be rigid in both the axial and the radial direction. The guide rings 7, on which the cage sections 4 are slidably mounted, hold the sections together and prevent them from being thrown outwards during rotation of the bearing and also prevent them from skewing relative to the ideal axis of rotation of the rollers 8 located in the pockets of the cage. Thus, the real axes of the rollers 8 will be made to assume positions practically coinciding with the ideal axes. In order to prevent the cage sections from falling out of the guide rings 7 during assembly, the outer portions of the grooves 6 are constricted by providing one of the walls 10 of the grooves 6 with a circular rib 9 at its outer edge. The wall 10 is resilient whereby the cage sections can be snapped onto the guide rings 7.

In order to make it possible to apply the last cage section to the guide rings, there is provided sufficient space between adjacent sections so that by sliding the cage sections along the guide rings, the distance between sections adjacent to the last applied section can be made greater than the length of the arcuate portions 4a of the cage member. It is thus possible to insert the last cage member axially into the center of the guide rings and then move it radially outwards into position. During the rotation of the bearing, the temperature rises and the cage members expand and thus substantially eliminate any play which may result.

When assembling the bearing, the cage is first assembled separately and is then mounted on the inner race ring. The rollers 8 are then snapped into position in the pockets past projections 11 on the cross bars which prevent the rollers from falling out of the pockets.

Figs. 5 and 6 show a roller bearing similar to that shown in Figs. 1 and 2. The cage sections 12 comprise arcuate portions 12a and cross bars 12b. The cage in this case is centered so that the convex surfaces 13 of the arcuate portions 12a slide on the flanges 15 of the outer race ring, the radius of the surface 13 being less than the radius of the sliding surfaces of the flanges 15 to provide a crescent-shaped clearance space, for example as shown in exaggerated form at 15a in Fig. 6. The guide rings 14, comprising also in this case rings of sheet metal, are formed somewhat differently. The requirement as to stiffness in the axial direction has been met thereby that each ring comprises two flat annular portions or flats 14a and 14b displaced axially relative to each other and interconnected by a frusto-conical portion or web 14c. The section 12 is held in place on the ring 14 by a circular rib 16.

It is also possible to center the cage on the rollers as shown in Figs. 7 and 8. The principal difference between the sections 31 in these figures and the sections 4 is that the roller-confronting surfaces of the cross bars 32 separating the rollers 33 conform to the rollers to a considerable extent. The arcuate portions 34 of the sections 31 are similar to the portions 4a, except that the inner surface 35 does not engage the inner race 36 of the bearing. The guide ring 37 is similar to the ring 7 and is engaged under a rib 38 on the arcuate portion 34.

When assembling the cylindrical bearings, the cage is first assembled separately. Thereafter, the cage is mounted in or on the flanged ring, the rollers are snapped into the pockets and the ring, cage and roller unit is mounted on or in the unflanged ring.

The form of the invention shown in Fig. 9 relates to a double-row spherical roller bearing. In this embodiment of the invention, two rows of spherical rollers 40 are guided in a cage 41 made in sections 42 comprising arcuate end portions 43 and 44 connected by cross bars 45. The cage sections 42 of both rows are provided in their outer arcuate portions 43 with grooves 18 and fit accurately into guide rings 17 and are held in place by outward projections 46 on the end portions. The inner arcuate portions 44 are interconnected by a common guide ring 19 which is provided with grooves in which fit projections 20 on the cage members. It should be noted that both the groove 18 and the projections 20 are arranged circumferentially and are parallel with the ends of the rollers. The cage is centered on a separate roller guide ring 21 and on the races 22 of the inner ring 23 of the bearing.

The method of assembling cylindrical bearings described above cannot be used when assembling a double row spherical roller bearing having a cage common to both rows of rollers such as is shown in Fig. 9. In this case, the cage must be assembled on the inner race ring 23, but since the outer diameter of the guide ring 19 is greater than that of the opening 25 of the outer race ring 24, the guide ring must first be elastically deformed and inserted into the outer race ring after which the inner race ring 23 and its guide ring 21 is inserted into the outer race ring and the various members located as shown in Fig. 10 with the outer race ring 24 resting vertically on a bench or the like and the other members 19, 23 and 21 horizontally on a suitable support (not shown). In this position, the cage is assembled while the guide ring 19 is located so far to one side relative to the guide ring 21 that the cage sections 42 in one of the rows can be snapped into the ring 19 and thereafter into the guide ring 17. When one row has been completed, this portion of the cage is displaced sideways and the rollers are snapped into place behind projections 47 on the cross bars 45. The other row is then completed and the assembled cage is then rotated into registry with the outer race ring 24.

Fig. 11 shows a section of a portion of a spherical thrust bearing. The cage 26 comprises a plurality of sections 48 composed of arcuate portions 49 and 50 connected by cross bars 51. The cage sections 48 are held together by two guide rings 27. After the cage has been assembled in a manner similar to that of the cage shown in Fig. 1 and has been mounted on the flanges 29 and 30 of the race ring 28, the rollers 31 are snapped into the pockets after which the flange 30 prevents the ring 28, the cage and the rollers from falling apart.

In addition to the advantages mentioned in the foregoing, the cage has the following advantages. Rectangular cage sections of plastic can be very easily made by an injection moulding or casting operation. The guide rings are simple in form and easily made. They are preferably angular in section whereby they will be sufficiently stiff in both the axial and radial direction while being of light weight. Since the guide rings are without holes or other irregularities, they will be very cheap to manufacture. A round or circular section may be used in certain cases.

It may also be pointed out that the cage is easy to assemble and also easy to take apart when it is desired to inspect or repair the bearing. Further, a cage section which has become damaged may be replaced by a new one. The cage sections may be so dimensioned that the same cage section may be used in a cage either for centering in the outer ring or on the inner ring.

The portions of the sections which form the cross bars between the rollers are suitably provided with projections directed into the pockets which prevent the rollers from falling out when they are not supported by the bearing ring, e.g. during the assembling operation.

The invention may also be used in radial and thrust taper roller bearings.

While particular embodiments of the invention have been herein illustrated and described, it is not intended to limit the invention to such disclosure, but changes and modifications may be made therein and thereto within the scope of the following claims.

What is claimed is:

1. For a roller bearing having rollers disposed intermediate a pair of opposed race rings, an annular cage comprising a plurality of cage sections of plastic material and guide rings engaging said sections and interconnecting the same to form the cage, each section consisting of a pair of arcuate portions and at least two circumferentially spaced cross bars mounting said arcuate portions in axially spaced parallel relation to define at least one roller-receiving pocket therein, said arcuate portions having means engaging said guide rings to limit radially outward displacement of said sections whereby said guide rings counteract the centrifugal forces on said cage section, said means being constructed to afford slidable displacement of said sections in a circumferential direction on the guide rings.

2. A roller bearing cage according to claim 1 wherein a limited clearance is provided between adjacent said cage sections on said guide rings, the total clearance between the cage sections being so great that the minimum distance between sections adjacent the last-applied cage section can be made greater than the maximum length of the arcuate portions of the said section by sliding all of said sections into abutting relationship on said rings.

3. For a roller bearing having rollers disposed intermediate a pair of opposed race rings, an annular cage comprising a plurality of cage sections of plastic material and guide rings engaging said sections and interconnecting the same to form the cage, each section consisting of a pair of arcuate portions and at least two circumferentially spaced cross bars mounting said arcuate portions in axially spaced parallel relation to define at least one roller-receiving pocket therein, said arcuate portions having means in their outer circumferential surfaces releasably interlocking with said guide rings to guide said cage sections and limit radially outward displacement of said sections whereby said guide rings counteract the centrifugal forces on said cage sections.

4. A roller bearing cage according to claim 3 wherein said ring-engaging means comprises a groove in each arcuate portion, the opening of which is constricted, at least one of the walls forming the groove being sufficiently resilient to permit the constricted portion to pass the guide ring when assembling the cage.

5. A roller bearing cage according to claim 3 wherein the guide rings comprise two substantially plane offset annular radially-disposed flats and an axially-extending portion intermediate said flats mounting the same in axially-spaced planes.

6. A roller bearing cage according to claim 3 wherein the guide ring-interlocking means of the cage sections are disposed transverse to the axes of the pockets to afford slidable displacement of said sections in a circumferential direction on the guide rings.

7. A roller bearing having an annular cage, rollers in said cage, and a pair of opposed inner and outer race rings receiving the rollers and cage therebetween, said annular cage comprising a plurality of cage sections of plastic material and guide rings engaging said sections and interconnecting the same to form the cage, each section consisting of a pair of arcuate portions and at least two circumferentially-spaced cross bars mounting said arcuate portions in axially-spaced parallel relation to define at least one roller-receiving pocket therein, said arcuate portions having means engaging said guide rings to limit radially outward displacement of said sections whereby said guide rings counteract the centrifugal forces of said cage sections and projecting convex surfaces slidable in the outer race ring, the radius of curvature of said convex surfaces being less than the radius of curvature of the race ring surface on which they slide.

8. A roller bearing having an annular cage, rollers in said cage, and a pair of inner and outer opposed race rings receiving the rollers and cage therebetween, said annular cage comprising a plurality of cage sections of plastic material, and guide rings engaging said sections and interconnecting the same to form the cage, each section consisting of a pair of arcuate portions and at least two circumferentially-spaced cross bars mounting said arcuate portions in axially-spaced parallel relation to define at least one roller-receiving pocket therein, said arcuate portions having means engaging said guide rings to limit said radially-outward displacement of said sections whereby said guide rings counteract the centrifugal forces on said cage sections and projecting concave surfaces slidable on the inner race ring, the radius of curvature of said surfaces being greater than the radius of curvature of the race ring surface on which they slide.

References Cited in the file of this patent

UNITED STATES PATENTS

| | | |
|---|---|---|
| 1,355,303 | Bingham | Oct. 12, 1920 |
| 1,355,304 | Bock | Oct. 12, 1920 |
| 2,044,663 | Brodin | June 16, 1936 |
| 2,327,237 | Baden | Aug. 17, 1943 |
| 2,665,958 | Waldherr | Jan. 12, 1954 |